United States Patent [19]

Noguchi et al.

[11] 3,827,732

[45] Aug. 6, 1974

[54] PIPE JOINT ASSEMBLY

[75] Inventors: Masaaki Noguchi, Nagoya; Takezo Kawahara, Toyota, both of Japan

[73] Assignee: Toyota Jidosha Kogyo Kabushiki Kaisha, Toyota-shi, Aichi-ken, Japan

[22] Filed: Nov. 27, 1972

[21] Appl. No.: 309,784

[30] Foreign Application Priority Data
Dec. 4, 1971  Japan.............................. 46-114286

[52] U.S. Cl............... 285/342, 285/369, 385/382.7, 285/423
[51] Int. Cl......................................... F16l 19/08
[58] Field of Search ........... 285/321, 340, 342, 343, 285/382.7, 369, 423

[56] References Cited
UNITED STATES PATENTS

| | | | |
|---|---|---|---|
| 2,398,618 | 4/1946 | Chavayda | 285/342 |
| 2,437,632 | 3/1948 | Wolfram | 285/342 |
| 2,466,526 | 4/1949 | Wolfram | 285/342 X |
| 2,523,874 | 9/1950 | Moore | 285/342 X |
| 2,816,472 | 12/1957 | Boughton | 285/342 X |
| 3,278,206 | 10/1966 | Woodling | 285/382.7 X |

Primary Examiner—Mervin Stein
Assistant Examiner—David H. Corbin
Attorney, Agent, or Firm—Stevens, Davis, Miller & Mosher

[57] ABSTRACT

Disclosed herein is a pipe joint assembly which comprises a joint body member to hold the jointing end of a pipe therein, a fastening nut to be threaded on the body member, a lock ring protector provided with a plurality of flaps at its inner end and coupled with the outer circumference of the pipe to be positioned between the inner wall of a radial collar portion of the nut and a tapered portion formed within the body member, a lock ring member coupled with the lock ring protector to be positioned between the inner wall of the radial collar portion and the tapered portion, and a seal ring coupled with the pipe in a space between the tapered portion and the outer circumference of the pipe. The seal ring is in contact with the inner end of the lock ring member at its one end. In clamping the nut over the body member, the seal ring is deformed by way of the lock ring member to form the sealing between the body member and the pipe, and the flaps of the lock ring protector pierce into the pipe.

6 Claims, 16 Drawing Figures

PATENTED AUG 6 1974 3,827,732

PIPE JOINT ASSEMBLY

BACKGROUND OF THE INVENTION

The present invention relates to a pipe joint assembly for connecting fluid pipes, and more particularly to the pipe joint assembly for connecting synthetic resin pipes, for instance, water pipes made of polyethylene and the like.

There have been introduced several types of the joint assembly for the synthetic resin pipes. They have, however, a common drawback that the jointed pipes are apt to get off by repeated inflation and shrinkage thereof caused by the changes of the temperature of the fluid running therethrough. Consequentially, the sealing effect is decreased and lost.

SUMMARY OF THE INVENTION

The present invention is to overcome the mentioned drawback and an object of the present invention is to provide a pipe joint assembly for connecting synthetic resin pipes, wherein the inflation and shrinkage of the pipes by the changes of the temperature of the fluid running therethrough is not a cause of the pipes getting off to decrease the sealing effect of the joint assembly.

Another object of the present invention is to provide a pipe joint assembly, having the mentioned characteristics, wherein the clamping of the joint assembly is not loosened by such external forces as oscillation, vibration and the like to act on the assembly by way of the jointed pipes.

A further object of the present invention is to provide a pipe joint assembly, having the mentioned characteristics, wherein no great torque is required in clamping the joint assembly for obtaining and maintaining the desired sealing effect.

Still another object of the present invention is to provide a pipe joint assembly, having the mentioned characteristics, wherein all the component parts are not required to be precisely manufactured, yet the desired sealing effect is obtained and maintained.

BRIEF DESCRIPTION OF THE DRAWINGS

Additional objects and advantages of the present invention will be more readily apparent from the following detailed description of embodiment thereof when taken together with the accompanying drawings in which.

DESCRIPTION OF THE PREFERRED EMBODIMENT

Figure 1:
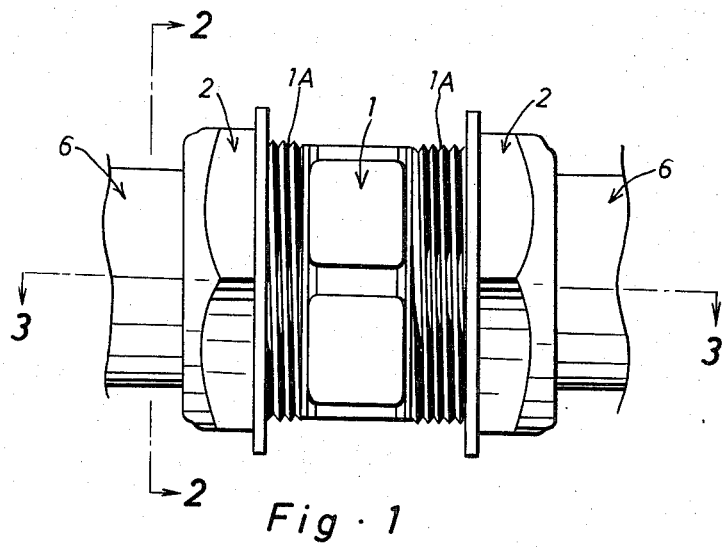
FIG. 1 is a side view of a pipe joint assembly in accordance with the present invention.
Figure 2:
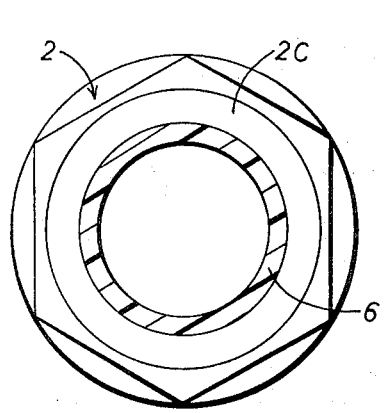
FIG. 2 shows a sectional view taken along 2 — 2 line in FIG. 1.
Figure 3:
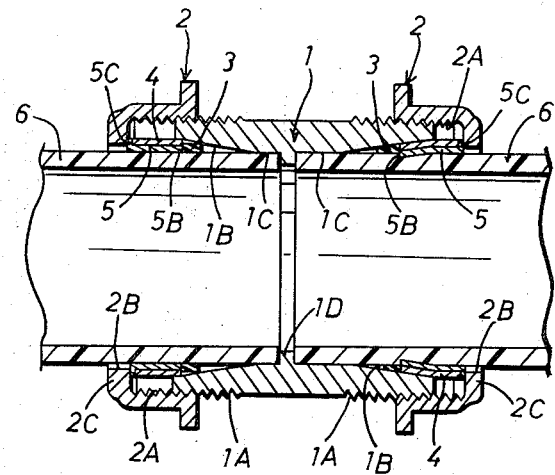
FIG. 3 illustrates a sectional side view taken along 3 — 3 line in FIG. 1, wherein the left half depicts the joint assembly loosely assembled and the right half shows the joint assembly clamped.

Now reference is made to the drawings and more particularly to FIGS. 1, 2 and 3 for the general construction of a preferred embodiment of a pipe joint assembly in accordance with the present invention. The left half of FIGS. 1 and 3 shows the loosely assembled condition and the right half illustrates the clamped state. The pipe joint assembly comprises a joint body member 1 having therein a cylindrical bore 1C which opens at the both ends and other component parts which are normally provided in pairs. The description is, therefore, made hereinafter on one each of the pairs. A fastening nut 2 is threaded on the body member 1. A seal ring 3 engages with the outer circumference of a pipe 6 inserted in the cylindrical bore 1C of the body member 1. The seal ring 3 is made of such elastic materials as fabric reinforced rubber and the like and the pipe 6 is made of synthetic resin, for instance, polyethylene. A lock ring member 4 is positioned axially between the nut 2 and the seal ring 3. And an annular lock ring protector 5 engages with the lock ring member 4 and the pipe 6 respectively at its outer and inner circumferences. The lock ring protector 5 is made of metal such as stainless steel and the like.

Figure 4:
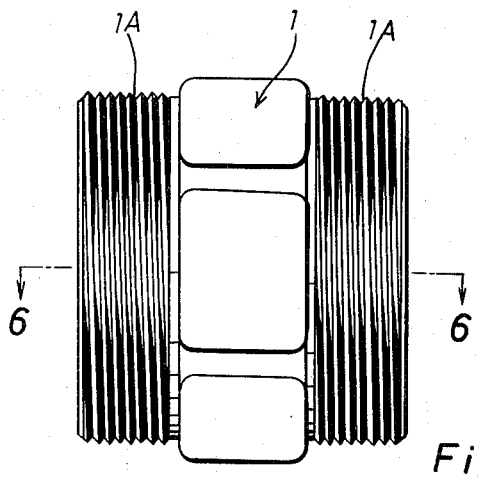
FIG. 4 is a side view of a joint body member of the assembly shown in FIG. 3.
Figures 5, 7:
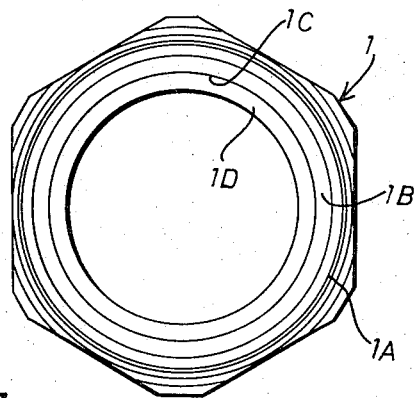
FIG. 5 shows a front view of the joint body member in FIG. 4.
FIG. 7 is a fragmental enlarged view of the male screw threads of the joint body member in FIG. 4.
Figure 6:
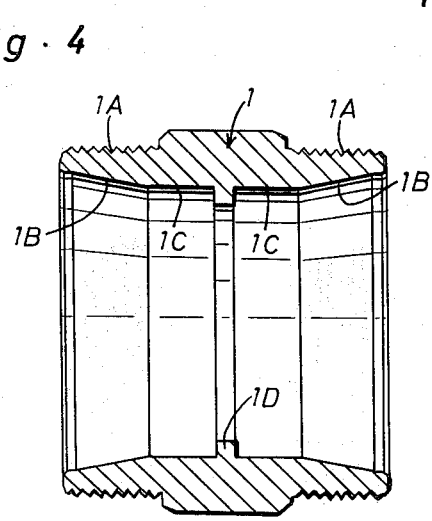
FIG. 6 is a sectional side view taken along 6 — 6 line in FIG. 4.

Detailed description on each component part is made hereinafter in reference with FIGS. 4 to 16, inclusive. And now referring to FIGS. 4 to 7, the cylindrical bore 1C of the body member 1 is provided integrally with an annular stopper portion 1D at the center thereof for positioning the jointing end of the pipe 6. The cylindrical bore 1C is tapered at its both ends, the tapered portions being represented with reference numeral 1B. Male screw threads 1A as well shown in FIGS. 4 and 7 are provided on the both ends of the outer circumference of the body member 1.

Figure 8:
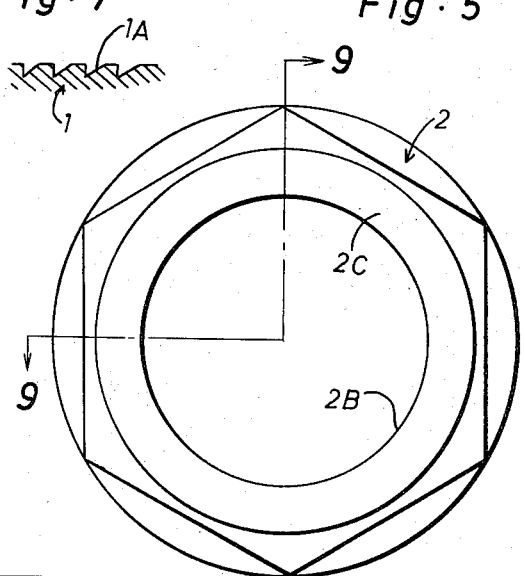
FIG. 8 shows a front view of a fastening nut of the joint assembly in FIG. 1.
Figure 9:
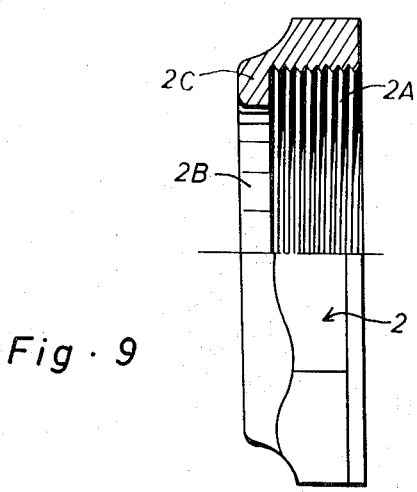
FIG. 9 is a partially sectional side view taken along 9 — 9 line in FIG. 8.
Figure 10:
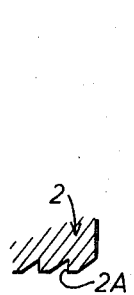
FIG. 10 illustrates a fragmental enlarged view of the female screw threads of the nut in FIG. 9.

Disclosed in FIGS. 8 to 10 is the fastening nut 2 which is provided with female screw threads 2A to engage with the male screw threads 1A of the body member 1. The nut 2 further includes an axial opening 2B to have the pipe 6 therethrough and a radial collar portion 2C to engage with one end of the lock ring member 4.

Figure 12:
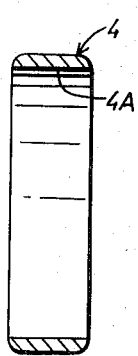
FIG. 12 is a cross-sectional view taken along 12 — 12 line in FIG. 11.
Figure 11:
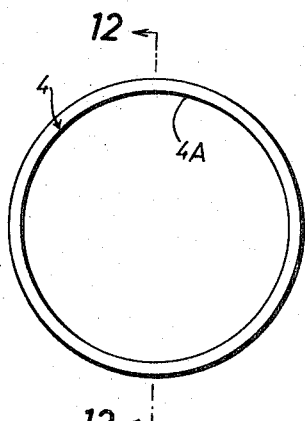
FIG. 11 shows a front view of a lock ring member of the assembly in FIG. 3.

FIGS. 11 and 12 illustrate the lock ring member 4 having a hole 4A to engage with the outer circumference of the lock ring protector 5. One end of the lock ring member 4 engages with the inner wall of the collar portion 2C of the nut 2 and the other end with the tapered portion 1B of the body member 1 when the lock ring member 4 is assembled.

Figure 13:
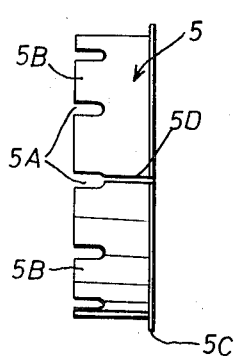
FIG. 13 depicts a side view of a lock ring protector of the assembly in FIG. 3.
Figure 14:
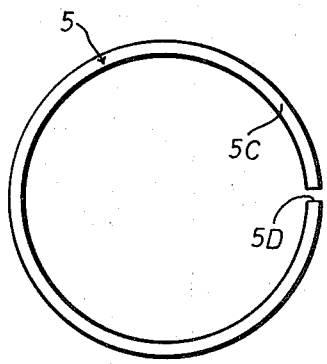
FIG. 14 is a front view of the lock ring protector in FIG. 13.

The lock ring protector 5 is detailed in FIGS. 13 and 14, wherein the lock ring protector 5 has a plurality of recesses 5A and consequentially a plurality of flaps 5B at one end thereof and an annular flange 5C at the other end. As well seen in FIG. 1, the lock ring protector 5 is interposed between the lock ring member 4 and the pipe 6 in a way that the flange 5C comes between the inner wall of the collar portion 2C of the nut 2 and the outer end of the lock ring member 4. The lock ring protector 5 is further provided with an axial slit 5D to effect resilience thereof so that when assembled with the lock ring member 4, the lock ring protector 5 stays pressed onto the inner circumference of the lock ring member 4.

Figure 16:
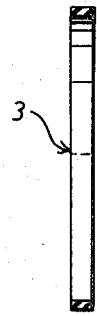
FIG. 16 illustrates a cross-sectional view taken along 16 — 16 line in FIG. 15.
Figure 15:
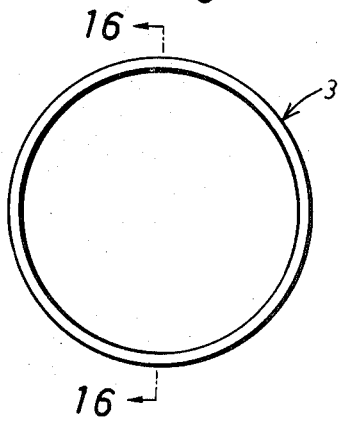
FIG. 15 is a front view of a seal ring of the joint assembly in FIG. 3.

As shown in FIGS. 15 and 16, the seal ring 3 is formed in a simple ring shape having a rectangular cross-section and made of the said elastic materials which should be softer than the body member 1 and the lock ring member 4. Other shapes for the cross-section of the seal ring 3 can as well be adapted without decreasing the sealing effect. The seal ring 3, when loosely assembled as shown in FIG. 3, engages with the tapered portion 1B of the body member 1 and the pipe 6 respectively at its outer and inner circumferences. The outer end of the seal ring 3 engages with the inner end of the lock ring member 4.

The component parts explained hereinabove are loosely assembled as shown in the left half of FIG. 3. And as the nut 2 is fastened or clamped in reference with the right half of FIG. 3, the seal ring 3 is pressed into the space between the tapered portion 1B of the body member 1 and the pipe 6 and deformed to establish the sealing effect thereby. At the same time the flaps 5B of the lock ring protector 5 pierce slightly but firmly into the pipe 6. Thus, the pipe 6 can well be prevented from getting out of the joint assembly by inflation and shrinkage thereof produced when affected by hot water, etc., running therethrough. At the same time, the sealing effect can remain unchanged.

With the above-described joint assembly, proper selections should be made for the materials, sizes and shapes of the nut 2 and the lock ring 4, for the shape of the screw threads 2A of the nut 2, and for the angles and areas of the contact faces of the collar portion 2C of the nut 2 and the lock ring 4 (or the flange 5C of the lock ring protector 5). And also, the nut 2 should be clamped within a predetermined torque. Consequentially, stress produced by each part is well balanced and remains within the return resilient limit of the each part and the frictional forces produced on the screw threads 2A and the said contact faces prevent the nut 2 from loosening. In other words, the pipe joint assembly of this invention will not be disturbed by such external causes as oscillations, vibrations, and the like. It should be added that in designing the joint assembly, it is very important to decide a proper size and resilience for the lock ring 4.

Although a certain specific embodiment of this invention has been illustrated and described, it is obvious that many modifications thereof are possible. The invention, therefore, is not intended to be restricted to the exact showing of the drawings and description thereof, but is considered to include reasonable and obvious equivalents.

What is claimed is:
1. A pipe joint assembly comprising:
   a joint body member provided with male screw threads at its outer circumferential end and a cylindrical bore therein to have a pipe snugly engaged therewith, said bore including an integral annular stopper at its inner portion for positioning the jointing end of said pipe and a tapered portion at its outer end;
   a fastening nut having female screw threads at its inner circumference to engage with said male screw threads of said body member, an axial opening therein to let said pipe go therethrough and a radial collar portion at its outer end;
   a lock ring protector coupled with the outer circumference of said pipe to be positioned between the inner wall of said collar portion of said nut and said tapered portion of said body member and provided with a plurality of flaps at its inner end;
   a lock ring member coupled with said protector at its outer circumference to be positioned between the inner wall of said collar portion of said nut and said tapered portion of said body member;
   said lock ring protector having an annular flange at its outer end, said flange being to engage with the inner wall of said collar portion of said nut and the outer end of said lock ring member respectively at its outer and inner faces; and
   a seal ring coupled with said pipe in a space between said tapered portion of said bore and the outer circumference of said pipe, one end of said seal ring being in contact with the inner end of said lock ring member;
   whereby in clamping said nut over said body member, said seal ring is deformed by way of said lock ring member and pressed between said tapered portion of said body member and the outer circumference of said pipe to establish its sealing effect and said flaps of said protector pierce into said pipe.

2. A pipe joint assembly as claimed in claim 1, wherein said lock ring protector is provided with an axial slit thereon so as to have resilience and is snugly coupled with the inner circumference of said lock ring member in assembling.

3. A pipe joint assembly as claimed in claim 1, wherein said lock ring protector is made of stainless steel.

4. A pipe joint assembly as claimed in claim 1, wherein said seal ring is made of fabric reinforced rubber.

5. A pipe joint assembly as claimed in claim 1, wherein said seal ring has a rectangular cross-section.

6. A pipe joint assembly as claimed in claim 1, wherein said joint body member comprises said male screw threads in pair at the both ends of its outer circumference and said tapered portion in pair at the both ends of said bore, said stopper being positioned at the central portion of said bore for positioning the jointing ends of pipes inserted into said bore from the both ends thereof, and said nut, lock ring member, lock ring protector and seal ring are used in pair to be assembled with said joint body member at the both ends thereof.

* * * * *